United States Patent [19]

Kowalics et al.

[11] Patent Number: 4,803,920

[45] Date of Patent: Feb. 14, 1989

[54] COOKING APPARATUS FOR FLUID CONTAINER

[75] Inventors: Raymond P. Kowalics, Solon; Kenneth C. Sidoti, Maple Heights, both of Ohio

[73] Assignee: The Meyer Company, Cleveland, Ohio

[21] Appl. No.: 144,314

[22] Filed: Jan. 14, 1988

Related U.S. Application Data

[63] Continuation of Ser. No. 849,780, Apr. 9, 1986, abandoned.

[51] Int. Cl.⁴ .............................................. A41J 27/00
[52] U.S. Cl. .......................................... 99/348; 99/516; 366/101
[58] Field of Search ................. 99/331, 332, 342, 344, 99/348, 409, 287; 219/432, 433, 436, 438; 126/387; 366/101

[56] References Cited

U.S. PATENT DOCUMENTS 3,940,589  2/1976  Tupper .
4,233,891  11/1980  Schindler et al. ..................... 99/348
4,314,766  2/1982  Lapeyre et al. ..................... 366/101
4,576,089  3/1986  Chauvin ................................ 99/332

FOREIGN PATENT DOCUMENTS 3421322  12/1985  Fed. Rep. of Germany ........ 99/344

Primary Examiner—Timothy F. Simone
Attorney, Agent, or Firm—Fay, Sharpe, Beall, Fagan, Minnich & McKee

[57] ABSTRACT

A cooking apparatus includes a recessed area adapted to receive an associated fluid container for cooking soup and similar food products. Means for heating the recessed area as well as insulating means therearound minimizes heat loss and effectively heats the fluid container. Means for mixing the soup held in the container preferably includes an air pump and a flow passage disposed between the base and fluid container. Means for sensing the temperature in the fluid container is coupled with a control means for monitoring the soup temperature and, in response, controlling the heating means. Various timing means provide an automated cooking cycle which reduces the soup temperature to a lower temperature after cooking and actuates an indicating means for either automatic or manual shutoff.

9 Claims, 3 Drawing Sheets

COOKING APPARATUS FOR FLUID CONTAINER

This application is a continuation of application Ser. No. 849,780, filed Apr. 9, 1986, now abandoned.

BACKGROUND OF THE INVENTION

This invention pertains to the art of fluid containers and more particularly to electrically heated soup kettles and cookers and the like.

The invention is particularly applicable to soup kettles having institutional application such as in restaurants, schools, cafeterias, and the like and will be described with particular reference thereto. However, it will be appreciated that the invention has broader applications and may be advantageously employed in other environments and applications.

Soup kettle apparatus have heretofore been comprised of a thick, earthenware pot, jar, or container adapted for operative engagement with a heating element. Oftentimes, the container is of generally cylindrical configuration and is inserted into a concentric housing for continuous heating of the container exterior by the heating element. The heating element is typically controlled by a simplified on/off switch or, alternatively, a high/low switch for supplying high and low power, respectively, to the heating element. In still other soup cooking apparatus, an adjustable electric heating element is incorporated in conjunction with a thermostat for maintaining a predetermined temperature. Soups, stews, and similar food products are placed in the earthenware jar and left to cook over extended periods of time.

Generally speaking, these prior soup kettle apparatus have met with some success but are limited in their cooking capabilities. That is, the soup kettles are designed primarily as a food warmer. Products are first cooked and then transferred hot to the kettle for serving. Therefore, two separate apparatus are required for cooking and serving.

There are, as indicated, cooking apparatus for fluid-type foods such soup, chili, stew, or the like. These cooking apparatus are also of limited complexity and require frequent tending. For example, if left unattended for an extended period of time, the fluid or food mixture contained therein may be brought to a boil or become overcooked. In an effort to promote more uniform cooking, it is necessary for a user to periodically tend to the food. Occasional stirring or regulation of the heating element in order to promote more uniform cooking enhances the flavor of the food product. If mechanical stirring is provided, such as by a propeller-like mixing blade, a severe problem with abrasiveness and deleterious agitation of the fluid mixture may result.

As is apparent, the prior cooking apparatus are extremely limited in use. Basically, the ingredients are measured and placed in the container and the heating apparatus actuated. Periodic stirring or tending is required to assure uniform cooking of the entire container's contents. Once the cooking time period has expired, the heating assembly is turned off and the food is removed for consumption.

It has been considered desirable to provide a structure which regulates the cooking process in a more efficient and precise manner. Specifically, adjustment of the heating element to prevent overcooking or boiling or, on the other hand, undercooking the food, is desired. Additionally, means for mixing the food in the container is desirable so that the food may be left unattended and, be assured of uniform cooking, without doing damage to the mixture.

The subject invention is deemed to meet these needs and overcome the above-noted problems and others in a simple, economical manner.

SUMMARY OF THE INVENTION

The present invention contemplates a new and improved cooking apparatus.

According to the present invention, the apparatus includes a first recessed area adapted to receive a fluid container and including a means for heating the recessed area. Insulating means are provided adjacent the first recessed area to minimize heat loss therefrom. Air is supplied to the associated fluid container for mixing purposes.

According to another aspect of the invention, preheating means are provided for preheating the air prior to introduction into the associated fluid container.

According to a further aspect of the invention, sensing means are disposed in the fluid container for monitoring the temperature therein.

According to yet another aspect of the invention, a processing means controls the heating means and includes timer means for altering the heating means actuation.

The principal advantage of the subject invention is provided in a cooking apparatus that automates the cooking cycle.

A further advantage of the invention resides in the enhanced flavor of the food provided by air injection mixing.

A further advantage is presented by the use of air as a mixing means, whereby deleterious abrasive effects which are resulted from mechanical mixing means are avoided.

Another advantage of the invention resides in the automated monitoring of the fluid temperature and resultant control of the heating apparatus.

Still other advantages and benefits of the invention will become apparent to those skilled in the art upon reading and understanding the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
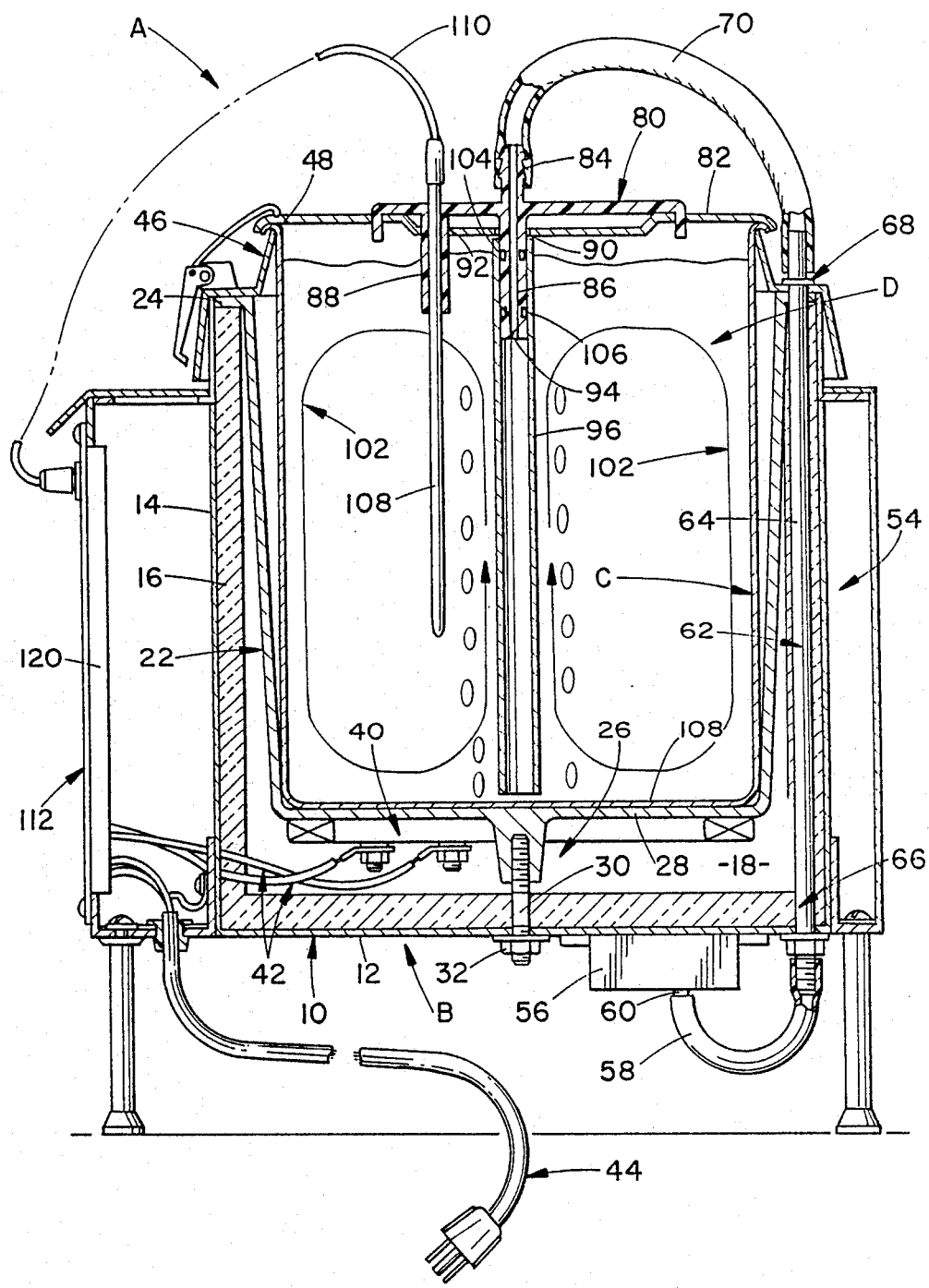
FIG. 1 is an elevational, cross-sectional view of the cooking apparatus in accordance with the subject invention.

Referring now to the drawings wherein the showings are for purposes of illustrating the preferred embodiment of the invention only and not for purposes of limiting same, FIG. 1 shows a cooking apparatus A comprising a main body or base portion B receiving a removable fluid container C therein. Within the fluid container C is illustrated fluid D which may comprise soup, chili, or the like. More specifically, the base portion B includes a housing 10 having a base wall 12 and sidewall 14. The sidewall may be formed from a plurality of distinct wall portions or, in the preferred embodiment, is a generally continuous member of generally cylindrical configuration. An insulation means or lining 16 extends along an interior wall of the housing. The insulation lining has a predetermined thickness in order to retain heat within a central cavity 18 defined by the housing. Various types of insulation may be used as long as they sufficiently inhibit heat transfer outwardly from the housing as will become more apparent hereinbelow.

An insert 22 defines a recessed area in housing 10 and the insert is retainingly held in the cavity 18 defined by the housing. The insert is of generally cylindrical configuration and, in the preferred embodiment, is formed from aluminum or other durable, heat-conductive material. A radially outwardly extending rim portion 24 is defined along the periphery of the insert at its upper end and is designed for mating relation with the sidewall 14 of the housing. The insert is spaced radially inwardly from the insulation lining generally along its axial length so that cavity 18 is generally continuous therebetween. A mounting means 26 is defined at a base wall 28 of the insert and is adapted to fixedly retain the insert in spaced relation from wall 12 of the housing. As shown, the mounting means 26 comprises an elongated, threaded stud 30 extending from the insert, through the insulation lining 16, and outwardly through the housing base wall 12. An appropriate washer and nut assembly 32 cooperates with the threaded stud to retain the insert in a fixed, spaced relation relative to the housing.

A heating means 40 is positioned in the cavity 18 adjacent the base wall 28 of the insert. The heating means is typically an electrically actuated heating element or coil that evenly distributes the heat along base wall 28. A pair of lead lines 42 extend from the heating means for operative connection with a power souce such as through male electrical plug 44.

The removeable, fluid impervious container C is also of generally cylindrical configuration and adapted for close receipt within the insert 22. The fluid container is normally of stainless steel construction and, as shown, rests in abutting engagement with base wall 28 of the insert. The fluid container is designed to hold soups, chili, or similar food products therein through a predetermined cooking cycle and maintain the food products at a serving temperature. A shroud assembly 46 extends over the insert and housing sidewalls for mating engagement with a peripheral lip portion 48 of the fluid container. The shroud assembly positions the fluid container in concentric relation with the insert and prevents entry of foreign matter therebetween.

A mixing means 54 extends between the base portion B and the fluid container C for mixing the soup retained therein. The mixing means includes a means for compressing air such as air pump or compressor 56. The air pump is fixedly mounted along the base wall 12 of the housing and, in the preferred embodiment, includes a first flexible tube or passage 58 extending from a pump outlet 60 to a preheating means 62. Though preheating the air is not mandatory, an added advantage of more rapid and uniform soup heating is realized through its implementation.

To effectuate preheating of the air, the preheating means is received in cavity 18 and interposed between the insulation lining 16 and insert 22. Preferably, the preheating means includes an elongated passage or tube 64 formed of copper, brass, or similar heat-conductive material and designed to readily transfer heat from the cavity 18 to the compressed air flowing through passageway 64. A first end 66 of the elongated passage extends outwardly through the housing base wall 12 and operatively receives the other end of flexible tube 58 thereon. A second end 68 of the passageway extends outwardly from the upper portion of housing 10 adjacent the insert rim portion 24. A second flexible tube or passage 70 extends from the passage second end 68 to a probe holder 80.

The holder 80 is centrally disposed in a fluid container lid 82 and is shown in press-fit relation therewith, although other arrangements can be used with equal success. A nipple 84 extends outwardly from one face of the probe holder and is adapted for sealing relation with the flexible tube 70. First and second tubular portions 86,88 extend from the opposed face of the probe holder and are received through openings 90,92, respectively, in the container lid. The first tubular portion 86 is aligned with nipple 84 and a passage 94 defined therethrough. Further, the tubular portion 86 is received in an elongated central passage 96 disposed on an inner face of the container lid. A pair of spaced seal rings 104,106 provide a tight, sealing fit between the tubular portion 86 and central passage 96.

The elongated central passage 96 extends from the lid 82 to an area adjacent a bottom portion 108 of the fluid container C. The lower end of central passage 96 defines the outlet for the compressed air supplied by pump 56. As is apparent, mixing means 54, specifically pump 56, compresses filtered air that is emitted at outlet 60, passes through first flexible tube 58, and into the preheating means 62. The tubular passage 64, as indicated above, is formed of a thermally conductive material to warm the air as it passes upwardly to second end 68. The air then continues through second flexible tube 70, through the probe holder passage 94 to elongated central passage 96, and exits along the base of fluid container C.

The central location of the elongated passage outlet is diposed at the bottom of the fluid container to promote better mixing and more uniform cooking of the soup contained therein. The mixing means provides a bubbling action that is dispersed along the base of the container and flows upwardly to the surface of the soup. This bubbling action is similar, in effect, to a slow stirring action.

As illustrated, the bubbling induces fluid flow upward at generally the center of the fluid container C. This provides a generally toroidal flow of the fluid as indicated by the flow line 102. Such a fluid path tends to most uniformly expose all fluid to the effect of heating means 40 during a heating procedure.

A sensing means such as a probe 108 is also received in the probe holder 80 through second tubular portion 88. A suitable probe means is found in the Series 53-1 and 53-3 thermocouple probes of Fenwal Incorporated of Ashland, Mass. Such probes function to vary a current output to be indicative of a temperature exposure. The probe extends into the soup in the fluid container and monitors the temperature therein. A lead line 110 denotes a path from the probe for operative communication with a control box 112. The control box is mounted on the exterior of the cooking assembly housing 10 and is projected from deleterious effects of the heat by insulation lining 16. The control box includes a control means 120 comprising circuitry adapted to receive input commands and signals and process them for a corresponding predetermined output function. The control means 120 regulates the power supplied through electrical plug 44 and varies the output to lead lines 42 and, subsequently, heating means 40 according to a predetermined program. The probe 108 monitors the temperature of the soup so that adjustments can be made to the power supplied to heating means 40.

Figure 2:
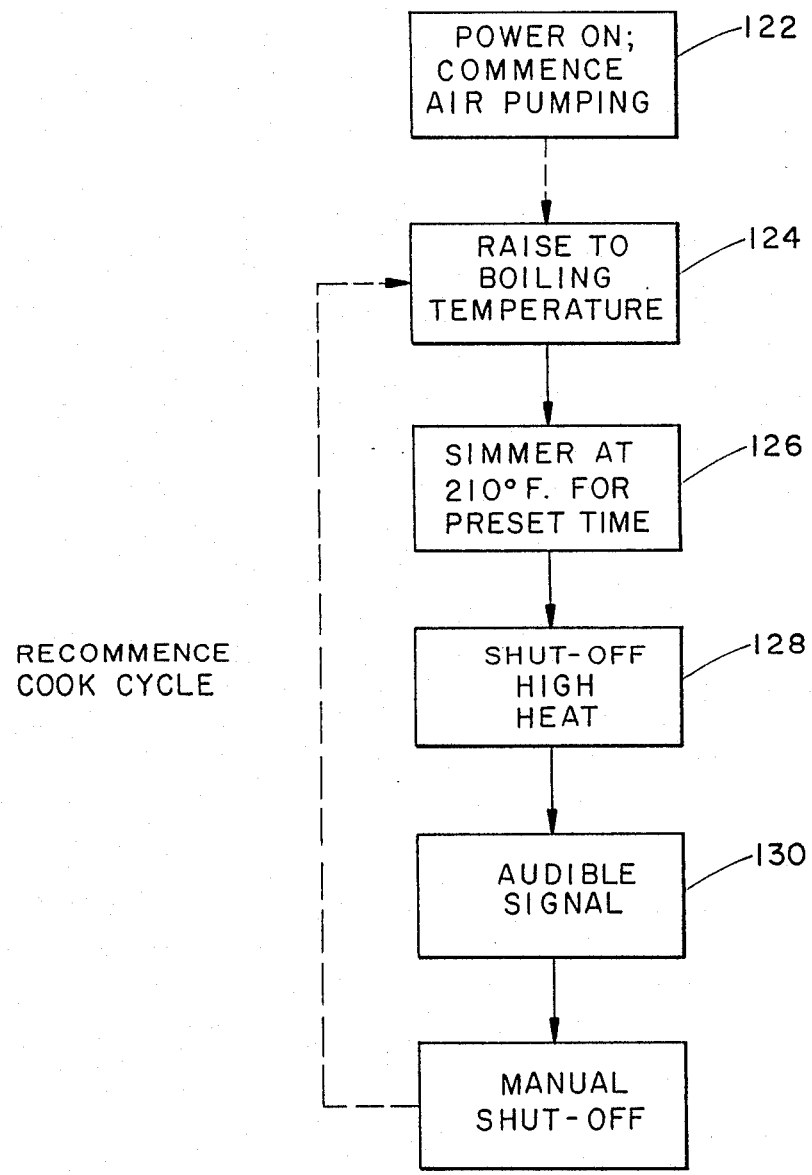
FIG. 2 is a schematic representation of a cooking cycle in accordance with the subject invention; and, FIG. 3 is a schematic representation of an electrical circuit in accordance with the cooking cycle of FIG. 2.

According to the control means 120, as represented by the flow chart illustrated in FIG. 2, an of/off switch supplies power to the apparatus. Once the food has been placed in the fluid container which, in turn, is positioned in the cooking apparatus A, a user actuates the on/off switch to supply power thereto as generally represented by step 122. An indicator means such as a light may give ready visual indication that power is being supplied to the apparatus. Preferably, the air pump 56 is actuated in this initial step 122. Once power is supplied, a cycle switch is actuated in step 124 to provide high power to the heating means 40. Typically, the heating means will bring the soup up to a temperature just below boiling.

The probe continuously monitors the soup temperature and provides a feed back signal by which the heating element 40 may be selectively enabled to achieve a preselected temperature once a predetermined temperature is reached a first timer is switched on allowing the soup to simmer and cook for a preselected time period, typically at a somewhat lower temperature 126. After cooking for the duration of the timer, the high power is shut off as indicated by block 128. Once the timing means has expired, an indicator means such as a horn or light can signal that the cooking cycle is over if desired. A manual shutoff may be performed as indicated by block 132, after which time the cycle may be recommended.

Once the power is actuated to the apparatus, the air pump 56 is actuated and continually mixes the fluid or soup D in the fluid container C. Therefore, as described above, a more uniform cooking of the soup is attained which, in turn, provides a more flavorful soup. The probe 108 continually monitors the soup temperature and the control means 120 makes the needed adjustments to the heating means 40 as required.

Figure 3:
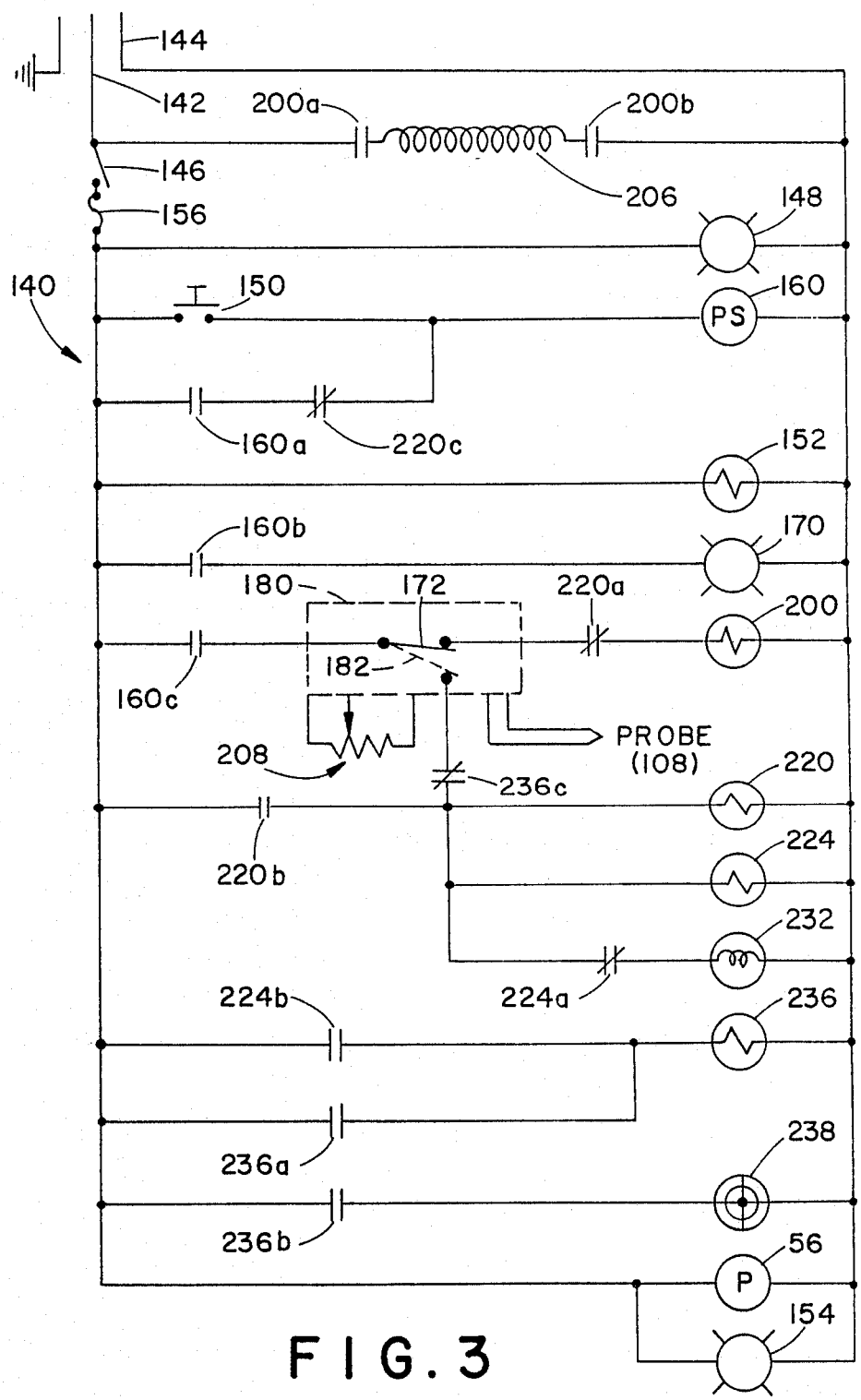

Turning now to FIG. 3, an electronic circuit for accomplishing the above soup cooking process will be described. The control circuit 140 has power input lines 142 and 144 at complementary voltage potentials. For ease of illustration, in the description below, coils for relays will be assigned a reference numeral, and a corresponding contact pairs of the coil will be assigned a letter subscript to the coil numeral. The operation of the timer circuit is commenced by closing switch 146. At this time, a circuit will be completed through indicating means such as pilot light 148. Pilot light 148 will remain actuated as long as the circuit 140 is enabled, that is, as long as switch 146 is in a conducting position. At the closing of switch 146, power is presented to a power supply 152 for a thermostatic control 180, the operation of which will be described below. Switch 146 also commences operation of the mixing means 54 (FIG. 1), which is illustrated as an air pump 56. An air pump indicator pilot 154 may provide an indicator of the activation of the pump. A fuse 156 is preferably provided as a safety device in the event of a short circuit during the activation of the circuit 140.

A cooking cycle is activated by depression of normally-opened switch 150 which is depicted as a push button type switch. Of course, comparable switches can be used with equal success without departing from the scope and intent of the subject invention. Actuation of the switch 150 supplies power to relay coil 160 (see 122, FIG. 2), thereby causing contacts 160a, 160b, and 160c to close. Electrical conduction through the contacts 160a maintains power to the coil 160 after the switch 150 is released. Conduction through contacts 160b causes thermostatic control indicator, such as pilot lamp 170, to be activated. Electrical conduction through contacts 160c provides power to normally-closed contact 172 of thermostatic control 180. The thermostatic control 180 may be comprised of a control such as a Fenwal series 544 thermocouple sensing temperature controller. The control 180 derives its operation power from the aforenoted power supply 152. Such a device incorporates a means for monitoring the output of a sensor such as probe 108, and to provide a control in accordance with the temperature thereat. The control 180 is adapted to function in conjunction with a variable resistor or potentiometer, the setting of which determines the maintained heat level.

When the thermostatic control 180 is in the closed position indicated at 172, a current path is present to a contactor coil 200. Energizing the coil 200, closes contacts 200a and 200b, thereby supplying power to a high heat unit which comprises a portion of heating means 40 (FIG. 1). The high heat unit 206 preferably is disposed below the removable fluid container C for heating the soup in accordance with the above-description. The high heat unit 206 has sufficient wattage to heat the soup at a rate of approximately 3° F. per minute. Upon reaching a preselected temperature, preferably just prior to the boiling point of the soup, which is generally assumed to be approximately 212° F., thermostatic control 180 switches from its closed position 172 to its open position indicated at 182. If the cooker is sufficiently well insulated, it may be desirable to terminate the high heat substantially prior to the boiling point, in that the temperature may continue to rise from residual heat in the coils and the cooker itself. A potentiometer 208 is provided in conjunction with thermostatic control 180 to allow for varying the temperature at which the state of the thermostatic control will change from its normally closed position at 172, to its normally open position at 182. Such an ability is desirable when the boiling point of the soup is varied due to such conditions as the altitude of the cooker, or the contents of the soup being prepared. The thermostatic control functions to compare signals received from the probe 108 (FIG. 1) to the setting of potentiometer 208.

When the thermostatic control 180 switches from its closed position 172 to its open position indicated at 182, a current path is completed to relay coil 220. At this time the contacts 220a are open, removing power from high heat contactor coil 200 thereby opening contacts 200a and 200b. The contacts 220b are also closed, thereby sustaining power to the coil 220. Contacts 220c are also opened, which removes power from the coil 160. Deactivation of the relay coil 160, removes power from the pilot light 170, by the opening of contacts 160b, and the thermostatic control 180 by the opening of contacts 160c. The entire high heat portion of the circuit is thereby disenabled.

The current path through contacts 220b supply power to a time delay relay coil 224, which is well known in the art. The time delay relay coil 224 functions to maintain its initial state for a preselected duration. While in its initial state, contacts 224a are closed, thereby supplying power to a low heat unit 232. The wattage of the low heat unit 232 is chosen so as to maintain the soup at a temperature generally 3° to 5° F. below the boiling point.

After the tolling of the preselected duration of the time delay relay 224, the contacts 224a open, thereby removing power to the low heat unit 232. At this time, contacts 224b are closed, supplying power to a relay coil 236. Energizing the coil 236 closes contacts 236a, which thereby sustain power to the coil 236. At this time also, contacts 236b are closed supplying power to an alarm, such as an audible signal which is generally indicated at 238. Contacts 236c are opened removing power to the entire low heat portion of circuit 140. The alarm will continue to be activated until the switch 146 is opened, at which time the control circuit 140 is readed for recommencement of the above-described cycle.

The invention has been described with reference to the preferred embodiment. Obviously modifications and alterations will occur to others upon reading and understanding of the specification. It is intended to include all such modifications and alterations insofar as they come within the scope of the appended claims or the equivalents thereof.

Having thus described the invention, it is now claimed:

1. A cooking apparatus for soups, chili, and the like comprising:
   a base portion having a recessed area defined therein;
   a removable fluid container adapted for close receipt in said recessed area;
   a heating element disposed in said base portion for heating said recessed area;
   means for insulating said base portion adjacent said recessed area and limiting heat loss therefrom; and
   means for supplying compressed air to bubble upwardly through the associated soup, chili, and the like, said supplying means being received in said fluid container wherein the associated soup, chili, and the like is slowly mixed and generally uniformly heated.

2. The apparatus as defined in claim 1 wherein said mixing means includes an air pump and flow passage communicating with an interior of said fluid container.

3. The apparatus as defined in claim 2 wherein a portion of said flow passage is disposed between said heating means and insulating means for preheating said air prior to introduction into said fluid container interior.

4. The apparatus as defined in claim 1 wherein said mixing means includes a source of compressed air supplied adjacent a bottom portion of said fluid container.

5. The apparatus as defined in claim 1 further comprising sensing means disposed in said fluid container for monitoring the temperature therein.

6. The apparatus as defined in claim 5 further comprising means for controlling said heating means.

7. The apparatus as defined in claim 6 wherein said control means includes a first means for supplying high power to said heating means.

8. The apparatus as defined in claim 7 wherein said control means includes a second means for supplying low power to said heating means.

9. The apparatus as defined in claim 8 wherein said second means maintains the fluid container at a generally constant temperature for a predetermined time period.

* * * * *